UNITED STATES PATENT OFFICE.

JNO. HOWARTH, OF SALEM, MASSACHUSETTS.

IMPROVED METHOD OF CLEANSING FIBROUS MATERIALS.

Specification forming part of Letters Patent No. 16,838, dated March 17, 1857.

*To all whom it may concern:*

Be it known that I, JOHN HOWARTH, of Salem, in the county of Essex and State of Massachusetts, have invented a new and Improved Method of Washing and Cleansing Fibrous Materials, and also where they are saturated with oil or grease of utilizing the same and converting it into soap, to be again employed in cleansing fresh portions of material; and I hereby declare the following to be a full, clear, and exact description of the same, and of the manner in which I have carried it out.

Cotton waste and other paper-stock have heretofore been prepared for use by boiling in a solution of caustic soda, by which process the quality of the stock is materially injured. I have, however, discovered that these materials may be much more expeditiously and perfectly cleansed, and without any sensible injury to the fibers, by treating them with a solution of soap and crude soda, and subjecting them to the mechanical action of a fulling-mill, by which means the materials are expeditiously and thoroughly cleansed, and the necessity of boiling the materials is avoided. Where the material is saturated with oil or grease, as is the case with cotton waste that has been used to wipe machinery, the mechanical action to which it is subjected, aided by the presence of the soap, causes the alkali to saponify the oil in the material, the boiling, as in the former case, being entirely dispensed with. That the expense of the agents employed may not detract from the value of the process, I have united therewith a method of recovering these agents after they have served the purpose for which they were employed, and of rendering them available for use upon fresh portions of material, as will now be more fully set forth and described.

Sixty pounds of oil-soap, and fifty pounds of crude soda-ash, or thereabout, are dissolved in two hundred gallons of water. The mixture is then warmed to about 180° Fahrenheit. These proportions may be varied according as the material is more or less dirty or saturated with oil. Suppose the material to be operated upon to be dirty oily cotton waste. Upon one hundred pounds of this material pour fourteen gallons of the above mixture, or a sufficient quantity to saturate the waste without excess, the strength of the solution being such that the soda which it contains shall be just sufficient to saponify the grease in the waste. After soaking about thirty minutes, the whole is removed to a fulling-mill, which is allowed to act upon it, as in the process of fulling woolen goods, the material being prepared in parcels just sufficient to charge the mill once. While undergoing this operation the soap induces the saponification of the oil by the alkali, which is effected in the space of about five minutes and without the necessity of boiling the materials. The whole is now removed to a powerful press, and the liquid and soap, including that formed from the soda employed, and the oil in the material is expressed. The material is then returned to the fulling-mill, and is again submitted to its action with sufficient cold water to cleanse it, and ultimately again being submitted to the action of the press, the stock is ready for immediate use in the paper-mill; or, if designed to be transported, it may be previously dried.

It now remains to describe the method which I have adopted for the purpose of economizing the agents employed, and of utilizing them for future operations.

The liquid expressed from the waste, including the dirt which was extracted therefrom, the soap originally employed and that formed by the soda, and the oil in the material, is heated to the boiling-point and saturated with salt to separate the soap from the dirty water. This soap, which consists partly of that originally employed and partly of that formed during the process of cleansing, may be again and again employed with fresh portions of cotton waste, the requisite quantity of soda being added to the soap each time it is employed. In place of salt, soda may be employed to separate the soap from the water. For economical considerations the salt is to be preferred.

What I claim as my invention, and desire to secure by Letters Patent, is—

The within-described process of cleansing fibrous materials, as set forth.

JOHN HOWARTH.

Witnesses:
SAM. COOPER,
THOS. L. GLOVER.